(No Model.)
F. A. HEDGES.
BUNDLE BINDER.
No. 546,326.  Patented Sept. 17, 1895.
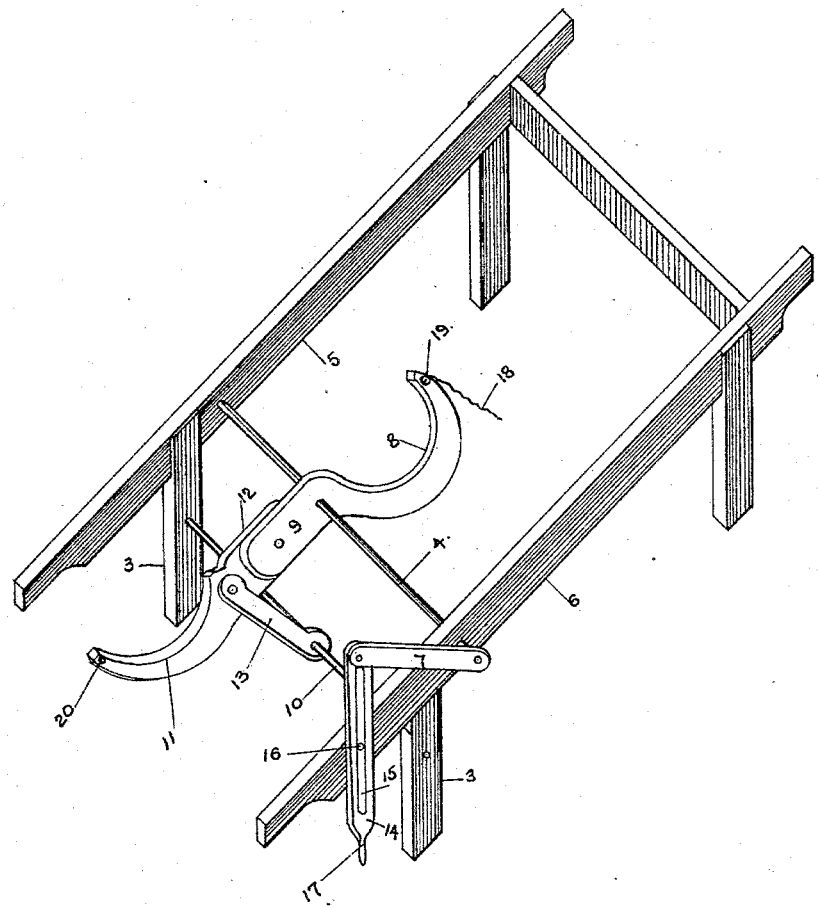
WITNESSES
Chas. A. Stanley.
V. C. Roehell
Francis A. Hedges INVENTOR
By H. T. Hartman Attorney

UNITED STATES PATENT OFFICE.

FRANCIS A. HEDGES, OF VERA CRUZ, INDIANA, ASSIGNOR OF ONE-THIRD TO HARRY C. HEDGES, OF SAME PLACE.

BUNDLE-BINDER.

SPECIFICATION forming part of Letters Patent No. 546,326, dated September 17, 1895.

Application filed April 3, 1895. Serial No. 544,227. (No model.)

*To all whom it may concern:*

Be it known that I, FRANCIS A. HEDGES, a citizen of the United States, residing at Vera Cruz, in the county of Wells, in the State of Indiana, have invented certain new and useful Improvements in Bundle-Binders; and I do hereby declare that the following is a full, clear, and exact description of the invention, which will enable others skilled in the art to which it appertains to make and use the same, reference being had to the accompanying drawing, which forms part of this specification.

My invention relates to improvements in machines for pressing and binding cornstalks, laths, or any material suitable to be bound in bundles. Its object is to furnish an improved machine for such purposes that shall be simple in construction, convenient and effective in use, and economical of manufacture; and the invention consists in the construction and novel combination of parts hereinafter described, pointed out in the appended claims, and illustrated in the accompanying drawing, in which the figure is a perspective view of the device with the top of the table removed to show the parts.

The table consists of a rectangular frame supported by legs and preferably provided with a cover or top of boards. (Not shown.) The operating-bar 4 is journaled in the two side bars 5 and 6 of the frame, with one end projecting through one of the side pieces 6, to which a crank-shaft 7 is rigidly attached.

A semicircular jaw 8, provided with an arm 9, is mounted rigidly upon the operating-bar 4 through a hole in its arm near the commencement of the semicircular jaw 8, so that any oscillation of the bar 4 will operate the jaw 8.

I place a rod 10 transversely in front of and below the operating-bar 4 and secure it in place, preferably by extending its ends into the two front legs 3 of the frame, as shown. Another semicircular jaw 11, provided with an arm 12, is pivotally connected to the jaw 8 at the ends of the respective arms 9 and 12 by a pivot.

A link 13 is pivoted at one end to the arm 12 near the commencement of the semicircle of the jaw 11, and the other end is provided with a hole through which the transverse rod 10 passes and holds it pivotally in place.

The operating-bar may be oscillated by any suitable means; but I prefer the construction therefor shown in the drawing, which consists of the crank-shaft 7, attached to its projecting end, and a pull-bar 14, provided with a longitudinal slot 15, through which a bolt 16 on one of the side bars 6 of the frame guides it, permitting the pull-bar 14 to slide to and fro. One end of the pull-bar 14 is pivotally attached to the crank-shaft 7 and the other is provided with a handle 17, near which and between the ends of the side bars 5 and 6 the operator stands. By this construction the operating-bar 4 is easily manipulated from the rear of the machine, where the operator stands, and the crank-shaft 7 can be made of such length that it will lie below the level of the top of the table out of the way when the corn-fodder is being placed in position and also when the bundle is being tied.

For convenience in tying the bundles I attach to the outer jaw 8 at its end a small pulley 19 and to the end of the other jaw a clip or pin 20. A ball of suitable twine is unwound to furnish a string 18, which passes through the pulley 19, and its end is attached to the clip or pin 20. The unwound portion lies loosely under the table.

The operation—say for corn-fodder—is as follows: The operator stands at the rear of the table and by pushing the pull-bar 14 turns the bar 4 until the end of the jaw 8 is almost level with it. This raises its arm 9, and by means of the pivotal connection also raises the arm 12 and lowers the jaw 11 to a similar position. As he husks the corn he throws the fodder over between the two jaws transversely until there is enough to form a bundle, then he pulls the bar 14, and by the reverse movement of the bar 4 closes the jaws 8 and 11 and clamps the fodder into a bundle. The end of the cord 18 is then detached from the pin 20 and enough cord pulled over the pulley 19 to tie the bundle, and then the remaining end of the cord is secured to the pin 20, which thereby carries it back to its position, when the jaws are open to receive another bundle.

Having thus described my invention, what I claim as new, and desire to secure by Letters Patent, is—

1. In a bundle binder of the class named, a frame to which are attached the transverse operating bar 4 and the rod 10: two semi-circular jaws provided with arms pivotally attached to each other at their ends, one of the arms being rigidly attached to the operating bar at a point near its jaw, and the other arm 12 pivotally attached at a similar point to a link: a link pivotally attached at one end to said arm 12 and pivotally secured to the transverse rod 10: and means to operate the bar 4.

2. In a bundle binder of the class named, a frame to which are attached the transverse operating bar 4 and the rod 10: two semi-circular jaws provided with arms pivotally attached to each other at their ends, one of the arms being rigidly attached to the operating bar at a point near its jaw, and the other arm pivotally attached at a similar point to a link: a link pivotally attached to said arm 12 at one end, and pivotally secured to the transverse rod 10: a crank shaft 7: a pull bar 14 and means to guide said pull bar.

3. In a bundle binder of the class named, a frame to which are attached the transverse operating bar 4 and the rod 10: two semi-circular jaws provided with arms pivotally attached to each other at their ends, one of the arms being rigidly attached to the operating bar at a point near its jaw, and the other arm 12 pivotally attached at a similar point to a link: a link pivotally attached to said arm 12 at one end, and pivotally secured to the transverse rod 10: a pulley attached to the end of one of the jaws: a clip or pin attached to the end of the other jaw, and a cord passing through said pulley and attached to the clip or pin on the other jaw.

4. In a bundle binder of the class named, a frame to which are attached the transverse operating bar 4 and the rod 10: two semi-circular jaws provided with arms pivotally attached to each other at their ends, one of the arms being rigidly attached to the operating bar at a point near its jaw, and the other arm 12 pivotally attached at a similar point to a link: a link pivotally attached to said arm 12 at one end, and pivotally secured to the transverse rod 10: a crank shaft 7: a pull bar 14 and means to guide said pull bar: a pulley attached to the end of one of the jaws; a clip or pin attached to the end of the other jaw, and a cord passing through said pulley and attached to the clip or pin on the other jaw.

In testimony whereof I hereunto subscribe my name, in the presence of two witnesses, this 27th day of March, 1895.

FRANCIS A. HEDGES.

Witnesses:
H. H. HARTMAN,
CHAS. A. STANLEY.